United States Patent
Gastaldi et al.

(10) Patent No.: US 12,522,369 B2
(45) Date of Patent: Jan. 13, 2026

(54) AIR INTAKE WITH CHANGING WALL THICKNESS AND ASSOCIATED NACELLE

(71) Applicant: Airbus Operations (S.A.S.), Toulouse (FR)

(72) Inventors: Umberto Gastaldi, Toulouse (FR); Brice Saudel, Toulouse (FR); Grégoire Smith, Toulouse (FR); Julien Aubry, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/788,352

(22) Filed: Jul. 30, 2024

(65) Prior Publication Data

US 2025/0042566 A1   Feb. 6, 2025

(51) Int. Cl.
*F02C 7/042* (2006.01)
*B64D 33/02* (2006.01)
*F02C 7/045* (2006.01)

(52) U.S. Cl.
CPC .............. *B64D 33/02* (2013.01); *F02C 7/042* (2013.01); *F02C 7/045* (2013.01); *B64D 2033/0206* (2013.01); *F05D 2220/323* (2013.01); *F05D 2250/90* (2013.01); *F05D 2260/96* (2013.01)

(58) Field of Classification Search
CPC ............ B64D 33/02; B64D 2033/0206; B64D 2033/0233; F02C 7/04; F02C 7/042; F02C 7/045; F02C 7/047; F05D 2220/323; F05D 2250/90; F05D 2260/96
See application file for complete search history.

(56) References Cited

U.S. PATENT DOCUMENTS

| | | | |
|---|---|---|---|
| 6,330,986 B1* | 12/2001 | Rutherford | B64D 15/14 244/134 R |
| 7,131,612 B2* | 11/2006 | Baptist | B64D 15/06 244/134 B |
| 2005/0045774 A1 | 3/2005 | Hocking | |
| 2012/0118400 A1 | 5/2012 | Bouillon | |
| 2020/0031487 A1* | 1/2020 | Wittman | F02C 7/05 |
| 2020/0070993 A1 | 3/2020 | Porte | |

FOREIGN PATENT DOCUMENTS

| | | |
|---|---|---|
| EP | 3248864 A1 | 11/2017 |
| FR | 3083777 A1 | 1/2020 |
| FR | 3099750 A1 | 2/2021 |
| FR | 3115221 A1 | 4/2022 |

OTHER PUBLICATIONS

European Search Report in EP Application No. 24191086, dated Dec. 19, 2024, 2 pages.

* cited by examiner

*Primary Examiner* — Steven M Sutherland
(74) *Attorney, Agent, or Firm* — KDW Firm PLLC

(57) ABSTRACT

An air intake that makes it possible to avoid stiffeners and a front frame includes a lip, at least one external panel extending the lip on the outer side, at least one internal panel extending the lip on the inner side, the wall of the air intake having a thickness of value e. The thickness of the wall of the air intake changes longitudinally and comprises a zone at the front longitudinal end having a thickness of value e2 greater than the thickness e. In this way, the thickness of the air intake is optimized according to the needs of the zone concerned. A nacelle and propulsive assembly are provided with such air intake.

17 Claims, 3 Drawing Sheets

AIR INTAKE WITH CHANGING WALL THICKNESS AND ASSOCIATED NACELLE

TECHNICAL FIELD

The disclosure herein relates to the air intake for an aircraft propulsive assembly and the nacelle comprising such an air intake and the propulsive assembly comprising such a nacelle.

BACKGROUND

An aircraft is propelled by a propulsive assembly comprising a turbojet engine which is surrounded by a nacelle. In most propulsive assemblies, a nacelle comprises, from the front to the rear, a first section P1, called air intake, upstream of the aerodynamic stream, the role of which is to capture and channel the air so as to ensure a flow to the fan of the turbojet engine and a second section P2, called main part, constituting the rest of the nacelle.

The patent FR3099750 filed by Airbus Operations SAS describes an air intake P1 such as that illustrated in FIG. 1. An air intake P1 comprises an air intake lip 1 disposed at the front end and making it possible to capture the air necessary to the supply of the engine. Internal panels 3 extend the lip on the inside of the nacelle. External panels 4 extend the lip on the outside of the nacelle. The air intake P1 usually comprises structural elements such as a front frame 2 and a rear frame 5. The panels 3 and 4 are borne by the front frame 2 and the rear frame 5. The air intake lip 1 is borne by the frame 2. The frame 5 defines the limit between the air intake P1 and the main part P2 of the nacelle. Stiffeners 6 in addition to the frames 2 and 5 are provided on the external panels 4 to make the air intake structure rigid and confer upon it a sufficient strength necessary to withstand the forces and shocks to which it is subjected, such as bird strikes for example.

The patent FR3083777 proposes an air intake 7, represented in FIG. 2, having one-piece segments 8 to facilitate the design and maintenance thereof and limit its impact on the drag. No front frame is provided, the rigidity being provided by the one-piece aspect.

The disclosure herein aims to go even further by eliminating the front frame and the stiffeners.

SUMMARY

To this end, the disclosure herein relates to an air intake comprising a lip, at least one external panel extending the lip on the outer side, at least one internal panel extending the lip on the inner side, the wall of the air intake having a thickness of value e, wherein the thickness of the wall of the air intake changes longitudinally and comprises a zone Z2 at the front longitudinal end having a thickness of value e2 greater than the thickness e.

The air intake with changing wall thickness thus makes it possible to overcome the removal of the front frame and of the stiffeners and to offer the rigidity necessary to the strains undergone.

The disclosure herein provides at least one of the following optional features, taken alone or in combination.

The air intake comprises an acoustic treatment zone Z4 at the inner face of the air intake beyond the zone Z2 having a thickness e2 smaller than the thickness e.

The air intake comprises an intermediate zone Z3 disposed between the front zone Z2 and the acoustic treatment zone Z4 having a substantially unchanging thickness e.

The air intake comprises at least one joining zone Z5 adjacent to the join between two walls forming all of the wall of the air intake, having a substantially unchanging thickness of value e.

The thickness e2 of the zone Z2 changes and is maximal at the longitudinally extreme transverse line B.

The change in the thickness of the zone Z2 longitudinally is identical on either side of the line B and decreases from a value e2 at the line B to a value e at the longitudinal ends of the zone Z2.

The maximum thickness e2 at the extreme line B of the zone Z2 has a value between 30 and 50% greater than that of the thickness e.

The thickness e4 of the zone Z4 has a value between 30 and 50% less than that of the thickness e.

The disclosure herein relates also to a nacelle comprising such an air intake.

The disclosure herein relates also to an aircraft provided with such a nacelle.

BRIEF DESCRIPTION OF THE DRAWINGS

Other aims, features and advantages will emerge from the following description of the disclosure herein, a description given purely as a nonlimiting example, with reference to the attached drawings in which.

DETAILED DESCRIPTION

Figure 1:
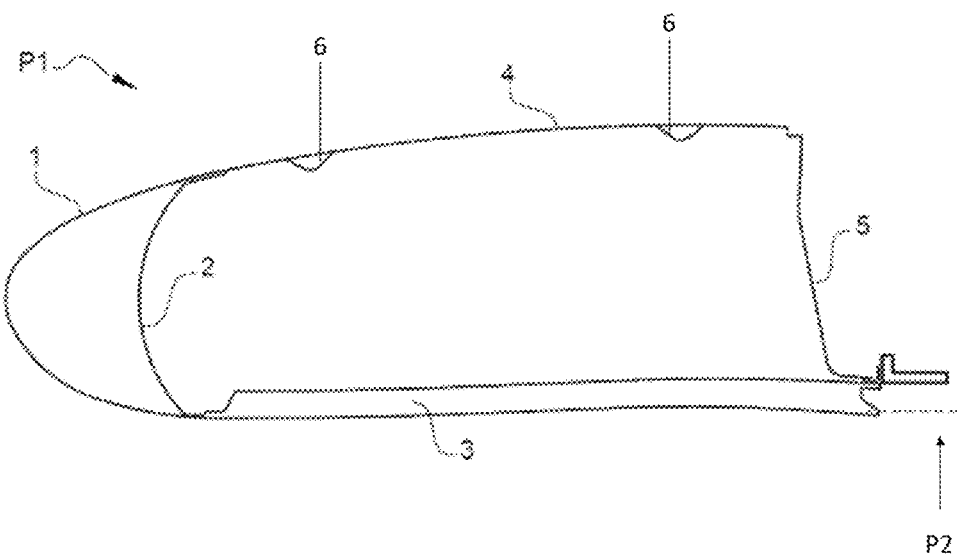
FIG. 1 is a lateral schematic view of a longitudinal section of an air intake with front and rear frames and stiffeners according to an embodiment of the prior art.
Figure 2:
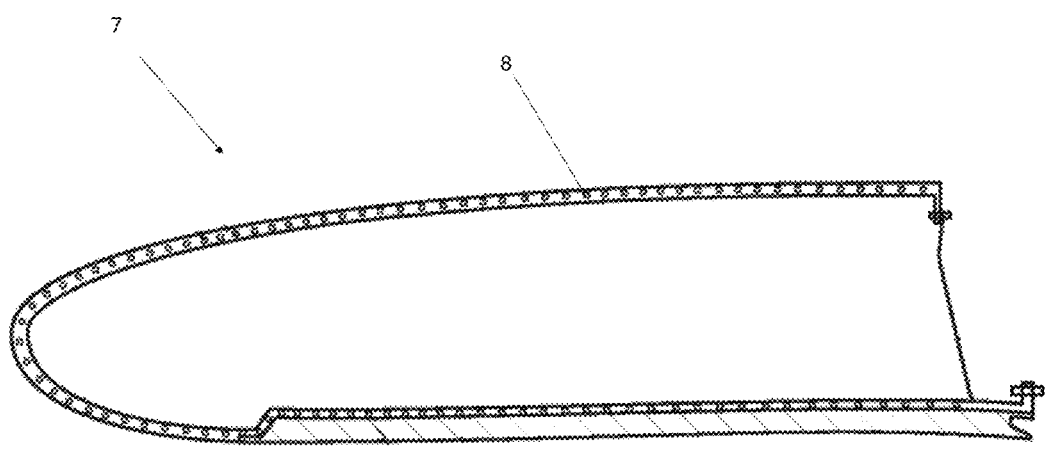
FIG. 2 is a lateral schematic view of a longitudinal section of an air intake with one-piece segments according to another embodiment of the prior art.
Figure 3:
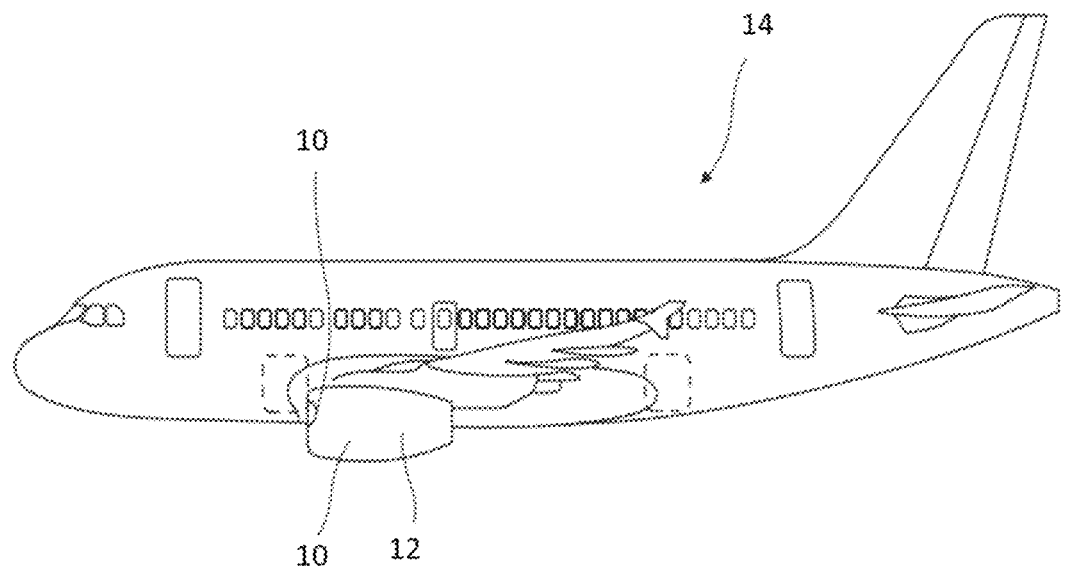
FIG. 3 is a lateral view of an aircraft provided with an air intake according to the disclosure herein.
Figure 4:
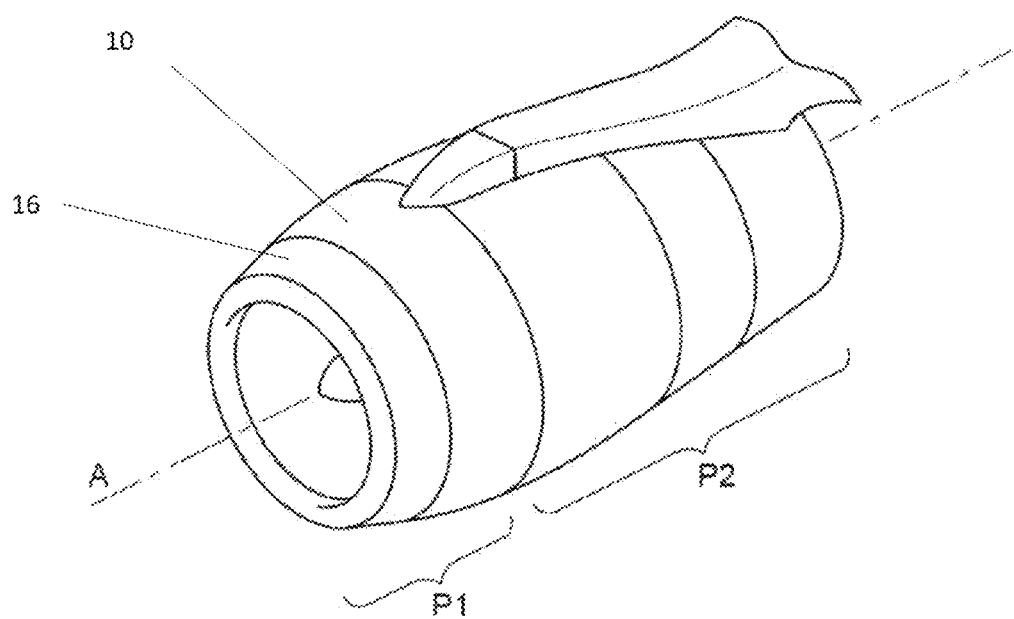
FIG. 4 is a perspective view of a propulsive assembly provided with a nacelle according to the disclosure herein having two parts highlighted.

As represented in FIGS. 3 and 4, the disclosure herein relates to a nacelle 10 of a propulsive assembly 12 of an aircraft 14.

As in most of the propulsive assemblies and explained above, the nacelle 10 as represented in FIG. 4 comprises, from the front to the rear, a first section, called air intake P1 and referenced 16, upstream of the aerodynamic stream whose role is to capture and channel the air so as to ensure a flow to the fan and a second section, called main part P2, constituting the rest of the nacelle. The air intake 16 has an annular circumferential form.

The propulsive assembly 12 and in particular the nacelle 10 extends about a longitudinal axis called longitudinal axis A. The axis A is the axis of the surface of revolution of the air intake 16. The expression "longitudinally" refers to a direction parallel to the central axis A of the air intake. A "longitudinal plane" is a plane containing the central axis A of the air intake. The concepts of front and rear, of anterior and posterior, and of upstream and downstream are understood throughout the following description to be in accordance with the direction of the air stream in the propulsive assembly: the air enters through the front of the propulsive assembly, namely through the air intake P1, and emerges through the rear, namely the rear end of the second section P2. The expressions "transverse direction" and "transversely" refer to a direction which extends in a transverse plane of the air intake, that is to say a direction which is orthogonal to the central axis A of the air intake.

The air intake 16 comprises an air intake lip 18 disposed at the front end and that makes it possible to capture the air necessary to the supply of the engine. External panels 20 extend the lip outside the nacelle and form an outer wall. Internal panels 22 extend the lip inside the nacelle and form an inner wall. The panels 20 and 22 delimit an internal duct making it possible to channel the air to a fan that is not represented.

Figure 5:
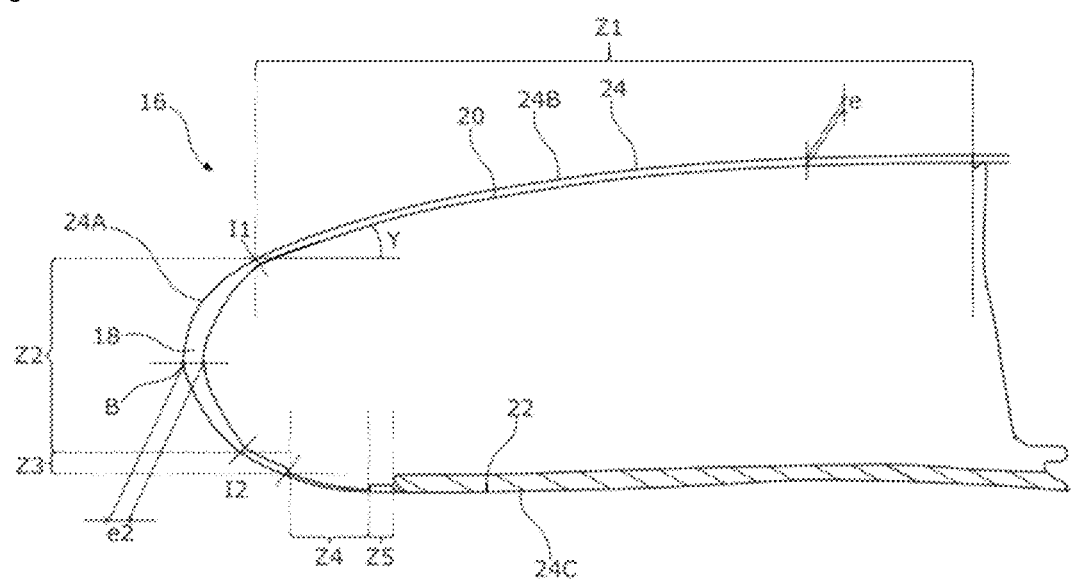
FIG. 5 is a lateral schematic view of a longitudinal section of an air intake with changing wall thickness according to the disclosure herein.

As represented in longitudinal section in FIG. 5, the wall 24 of the air intake 16 formed by the wall 24A of the lip 18 and the wall 24B of the panel 20 are continuous, i.e. longitudinally one-piece. Transversely, the air intake 16 can be made of a single piece or of several circumferential segments fixed to one another. In the embodiment illustrated, there is a join between the wall 24A and the wall 24C.

The wall 24 of the air intake according to the disclosure herein comprises a longitudinally changing thickness that is optimized according to the strains at the level considered. Thus, the wall 24 has several longitudinally successive zones Z1, Z2, Z3, Z4, Z5 of different thicknesses from one zone to the next adjacent zone. The zones Z1, Z3, Z4, Z5 have thicknesses that are substantially identical over most of their length (longitudinally), even all of their length (without considering their longitudinal ends). The zone Z2 on the other hand has a thickness that changes from one end to the other longitudinally: the thickness increases from a value e to a value e2 then decreases from the value e2 to the value e. In the zone Z2, the longitudinally extreme transverse line B is located. The changing of the increase in thickness is such that the value e2 is reached at the extreme line B. According to the present embodiment illustrated in FIG. 5, the lengths of the zone Z2 on either side of the line B to the zones respectively Z1 and Z3 (longitudinally) are identical. According to other embodiments, different lengths can be provided.

The air intake 16 has a zone situated at the longitudinally front end, called front zone Z2, an adjacent zone extending from the zone Z2 on the side of the external panels 20, called outer zone Z1, a zone adjacent to the front zone Z2 and extending towards the internal panels 22 to a zone Z4, called intermediate inner zone Z3, the zone Z4 adjacent to the intermediate zone Z3 to a zone Z5, called specific acoustic treatment zone Z4, and the last zone Z5 adjacent to the zone Z4 to the wall 24C, called joining zone Z5.

The front zone Z2 has, at the line B, a thickness e2 greater than those of the adjacent zones Z1 and Z3 because this front zone Z2 is the most exposed and therefore the most likely to undergo damage originating from impacts such as a bird strike, debris of any type, hail, etc. Thus, the thickness e2 of the wall 24 at the front zone Z2 is 30 to 50% greater than the thickness e of the wall at the adjacent outer zone Z1 and than the thickness e of the wall at the adjacent intermediate zone Z3. The positioning of the limit transverse line 11 between the zone Z1 and the zone Z2 and that 12 between the zone Z2 and Z3 is determined by the angle Y between the tangent in a plane longitudinal to the surface of the wall 24 at the lines 11, 12 and the axis A: the angle is substantially identical at the lines 11 and 12 and it is greater than 15 degrees. In the embodiment illustrated, the angle is greater than 20 degrees which is a good trade-off for reinforcing the zone that is most exposed to the impacts and not penalizing the weight by increasing its thickness over too great a surface.

The zones Z1, Z3 and Z5 have the same thickness e which is a thickness that makes it possible to incorporate fixings. The joining zone Z5 allowing the join between the wall 24A and the wall 24C necessitates the use of fixings and therefore of drill holes which demands a sufficient thickness and therefore a thickness of value e. The thickness e is also the conventional thickness of the nacelle allowing patch repairs entailing the use of fixings.

The zone Z1, even though it is not located at the front of the nacelle, remains an exposed zone and could therefore have, according to other embodiments, a thickness greater than the other zones except for the zone Z2 which will always have the greatest thickness.

The specific acoustic treatment zone Z4 is located inside the nacelle: thus, it has less structural strains and strains with respect to the impacts mentioned above. On the other hand, the needs for acoustic attenuation are greater. Also, it is possible to provide a particular acoustic treatment. It should be noted that no fixing is provided at this level. As a result, the zone Z4 has a thickness e4 smaller than the thickness e which will allow the application of an acoustic panel. In the embodiment illustrated, the thickness e4 of the zone Z4 has a value between 30 and 50% less than that of the thickness e.

According to a specific embodiment illustrating a series of possible thicknesses, the zones Z1, Z3 and Z5 have a thickness e of 2.125 millimeters. The front zone Z2 has a thickness e2 greater than 3 millimeters and the acoustic treatment zone Z4 has a thickness e4 smaller than 1.6 millimeters. The outer zone Z1 as seen above being an outer face can have a thickness a little greater than that of the zones Z3 and Z5 of 2.15 millimeters. However, to allow a progressive reduction of the thickness from the thicker front zone Z2 to the thinner acoustic treatment zone Z4, the intermediate zone Z3 can have a thickness greater than that of the wall at the zones Z1 or Z5 of approximately 2.2 millimeters.

The different wall thicknesses are obtained by machining after the forming of the wall 24.

The disclosure herein makes it possible to increase the strength of the wall while optimizing the performance levels (weight, acoustics, etc.) of the air intake and simplifying the manufacturing thereof at a lower cost.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air intake comprising:
a lip;
at least one external panel that extends the lip on an outer side of the air intake; and
at least one internal panel that extends the lip on an inner side of the air intake;

wherein the lip and the at least one external panel together define a wall that has a thickness that changes longitudinally; and wherein the wall comprises:
- a front zone, at a front longitudinal end of the air intake, wherein the front zone has a thickness that is greater than a thickness of any other portion of the wall; and
- an acoustic treatment zone at an inner face of the air intake, beyond the front zone, wherein the acoustic treatment zone has a thickness smaller than the thickness of the wall;

wherein the thickness of the acoustic treatment zone has a value between 30% and 50% less than a value of the thickness of another portion of the wall.

2. The air intake according to claim 1, comprising an intermediate zone, which is disposed between the front zone and the acoustic treatment zone and has an unchanging thickness.

3. The air intake according to claim 1, wherein:
the at least one internal panel defines a further wall, which is connected to the wall by a join; and
the wall comprises at least one joining zone that is adjacent to the join and has an unchanging thickness;
wherein the wall and the further wall form all walls of the air intake.

4. The air intake according to claim 1, wherein the thickness of the front zone changes and is maximal at a longitudinally extreme transverse line.

5. The air intake according to claim 4, wherein the change in the thickness of the front zone longitudinally is identical on either side of the longitudinally extreme transverse line and decreases from the longitudinally extreme transverse line to longitudinal ends of the front zone.

6. The air intake according to claim 4, wherein a maximum thickness at the longitudinally extreme transverse line of the front zone has a value between 30% and 50% greater than a value of the thickness of the wall.

7. A nacelle comprising the air intake according to claim 1.

8. A propulsive assembly for an aircraft, the propulsive assembly comprising the nacelle according to claim 7.

9. An air intake comprising:
a lip;
at least one external panel that extends the lip on an outer side of the air intake; and
at least one internal panel that extends the lip on an inner side of the air intake;
wherein the lip and the at least one external panel together define a wall that has a thickness that changes longitudinally;
wherein the at least one internal panel defines a further wall, which is connected to the wall by a join;

wherein the wall comprises:
- a front zone, at a front longitudinal end of the air intake, wherein the front zone has a thickness that is greater than thickness of any other portion of the wall; and
- at least one joining zone that is adjacent to the join and has an unchanging thickness; and wherein the wall and the further wall form all walls of the air intake;
wherein the thickness of the front zone changes and is maximal at a longitudinally extreme transverse line;
wherein a maximum thickness at the longitudinally extreme transverse line of the front zone has a value between 30% and 50% greater than a value of the thickness of the wall.

10. The air intake according to claim 9, wherein the change in the thickness of the front zone longitudinally is identical on either side of the longitudinally extreme transverse line and decreases from the longitudinally extreme transverse line to longitudinal ends of the front zone.

11. A nacelle comprising the air intake according to claim 9.

12. A propulsive assembly for an aircraft, the propulsive assembly comprising the nacelle according to claim 11.

13. An air intake comprising:
a lip;
at least one external panel that extends the lip on an outer side of the air intake; and
at least one internal panel that extends the lip on an inner side of the air intake;
wherein the lip and the at least one external panel together define a wall that has a thickness that changes longitudinally;
wherein the wall comprises a front zone, at a front longitudinal end of the air intake, wherein the front zone has a thickness that is greater than thickness of any other portion of the wall; and
wherein a maximum thickness of the front zone at a longitudinally extreme transverse line has a value between 30% and 50% greater than a value of the thickness of another portion of the wall.

14. The air intake according to claim 13, wherein the air intake comprises an acoustic treatment zone at the inner face of the air intake beyond the front zone having a thickness smaller than the thickness of the wall of the air intake.

15. The air intake according to claim 14, comprising an intermediate zone, which is disposed between the front zone and the acoustic treatment zone and has an unchanging thickness.

16. A nacelle comprising the air intake according to claim 13.

17. A propulsive assembly for an aircraft, the propulsive assembly comprising the nacelle according to claim 16.

* * * * *